(12) United States Patent
Brand

(10) Patent No.: US 11,062,734 B1
(45) Date of Patent: Jul. 13, 2021

(54) MULTI-SPINDLE AND MULTI-ACTUATOR DATA STORAGE DEVICES

(71) Applicant: Seagate Technology LLC, Cupertino, CA (US)

(72) Inventor: John L. Brand, Wauconda, IL (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/838,891

(22) Filed: Apr. 2, 2020

(51) Int. Cl.
| G11B 5/012 | (2006.01) |
| G11B 25/04 | (2006.01) |
| G11B 5/02 | (2006.01) |
| G11B 5/00 | (2006.01) |
| G11B 33/12 | (2006.01) |

(52) U.S. Cl.
CPC ............ *G11B 25/043* (2013.01); *G11B 5/012* (2013.01); *G11B 5/02* (2013.01); *G11B 33/121* (2013.01); *G11B 2005/001* (2013.01)

(58) Field of Classification Search
USPC ................... 360/98.01, 98.07, 98.08
See application file for complete search history.

(56) References Cited

U.S. PATENT DOCUMENTS

| 3,864,747 | A | * | 2/1975 | Pejcha | ................ | G11B 17/038 360/99.18 |
| 5,544,148 | A | * | 8/1996 | Nakamichi | ............ | G11B 17/30 360/98.07 |
| 6,115,215 | A | * | 9/2000 | Adams | ................... | G11B 5/553 360/264.4 |
| 6,483,660 | B1 | | 11/2002 | Akagi et al. | | |
| 6,628,469 | B1 | * | 9/2003 | Hoyt | ...................... | G11B 19/02 360/69 |
| 6,883,062 | B2 | * | 4/2005 | Susnjar | ............... | G11B 5/4886 360/246.6 |
| 8,958,172 | B1 | * | 2/2015 | Hansen | ............... | G11B 5/5573 360/98.01 |
| 9,218,833 | B1 | * | 12/2015 | Shah | .................... | G11B 5/4826 |
| 9,343,107 | B2 | * | 5/2016 | Burness | ............... | G11B 25/043 |
| 9,552,835 | B1 | * | 1/2017 | Tamayo | ............... | G11B 5/5521 |
| 2006/0044663 | A1 | * | 3/2006 | Stiles | ................... | G11B 25/043 360/69 |
| 2006/0152847 | A1 | | 7/2006 | Stiles et al. | | |
| 2009/0013342 | A1 | * | 1/2009 | Gilovich | ............. | G11B 33/121 720/695 |
| 2011/0122528 | A1 | | 5/2011 | Burness | | |
| 2020/0202891 | A1 | * | 6/2020 | Mendonsa | ............... | G11B 5/54 |

* cited by examiner

*Primary Examiner* — Jefferson A Evans

(74) *Attorney, Agent, or Firm* — Faegre Drinker Biddle & Reath

(57) ABSTRACT

A hard disk drive includes an enclosure housing a first set of magnetic recording media coupled to a first spindle motor, a second set of magnetic recording media coupled to a second spindle motor, and a third set of magnetic recording media coupled to a third spindle motor. The first set of magnetic recording media at least partially overlaps with the second set of magnetic recording media and the third set of magnetic recording media.

19 Claims, 5 Drawing Sheets

MULTI-SPINDLE AND MULTI-ACTUATOR DATA STORAGE DEVICES

SUMMARY

In certain embodiments, a hard disk drive includes an enclosure housing a first set of magnetic recording media coupled to a first spindle motor, a second set of magnetic recording media coupled to a second spindle motor, and a third set of magnetic recording media coupled to a third spindle motor. The first set of magnetic recording media at least partially overlaps with the second set of magnetic recording media and the third set of magnetic recording media.

In certain embodiments, a hard disk drive includes means for providing a total useable data storage area of 198-250 int and means for accessing the total useable data storage area.

In certain embodiments, a method includes rotating a first set of magnetic recording media coupled to a first spindle motor, rotating a second set of magnetic recording media coupled to a second spindle motor, and rotating a third set of magnetic recording media coupled to a third spindle motor. An envelope of the first set of magnetic recording media at least partially overlaps with envelopes of the second set of magnetic recording media and the third set of magnetic recording media.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
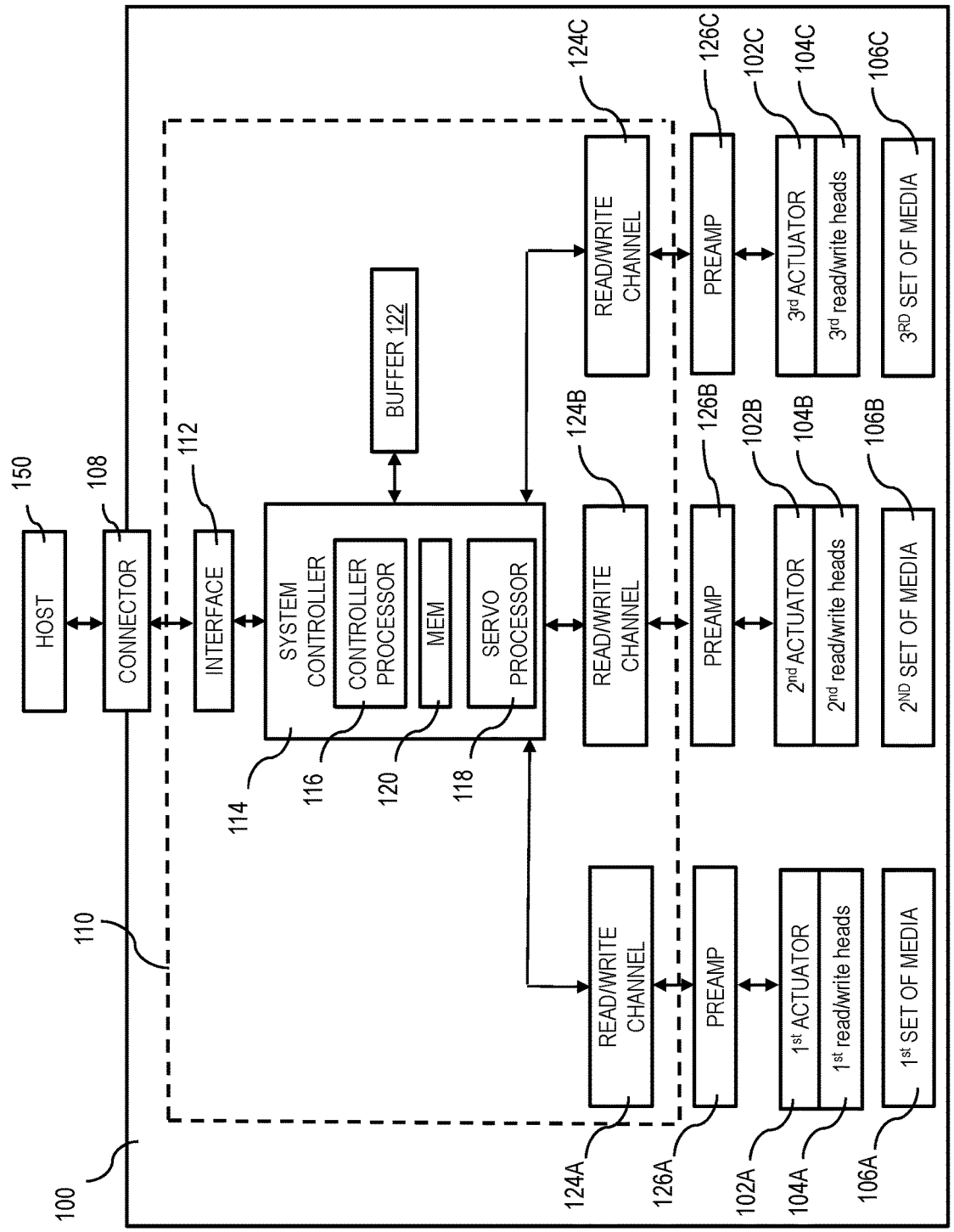
FIG. 1 shows a simplified schematic of a data storage device, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

FIG. 1 shows a schematic of a data storage device 100 (e.g., a hard disk drive) that includes a first actuator 102A, a second actuator 102B, and a third actuator 102C each coupled to one or more read/write heads 104A, 104B, and 104C to provide concurrent access to respective first set of magnetic recording media 106A, second set of magnetic recording media 106B, and third set of magnetic recording media 106C. The multiple actuators 102A-C have separate pivot axes and can be separately and independently controlled. Although three actuators for the data storage device 100 are shown in FIG. 1, in certain embodiments, the data storage device 100 may have more than three actuators. For example, the each set of magnetic recording media may be accessed by multiple actuators (e.g., a pair of stacked and independently-controllable actuators for each set of magnetic recording media that share common pivot axes).

The data storage device 100 includes an electrical connector 108 such as standardized electrical connectors (e.g., Serial Advanced Technology Attachment (SATA) electrical connector or a Serial Attached Small Computer System Interface (SAS) electrical connector). The electrical connector 108 can include various pins to communicate electrical signals between the data storage device 100 and a host 150 (e.g., a server, laptop).

The electrical connector 108 may be communicatively coupled to a system on a chip ("SOC") 110 (shown in dashed lines in FIG. 1). The SOC 110 may be an integrated circuit such as an application-specific integrated circuit ("ASIC") and field-programmable gate array ("FPGA") that includes instructions for carrying out various functions of the data storage device 100.

The SOC 110 can include an interface 112 (e.g., an input/output interface) for transferring data to and from the data storage device 100. For example, the interface 112, among other features, can be communicatively coupled between the host 150 (e.g., a data storage system such as a server or laptop) and the read/write heads 104A-C to facilitate communication between the read/write heads 104A-C and the host 150.

The SOC 110 includes a system controller 114 (hereinafter referred to simply as the "controller") with a controller processor 116 (e.g., a microprocessor), a servo processor 118 (e.g., a microprocessor), and memory 120 (e.g., volatile memory such as a dynamic random access memory ("DRAM"), static random access memory ("SRAM"), and the like). In certain embodiments, a separate respective bank of memory is dedicated to the controller processor 116 and to the servo processor 118, although the memory 120 can be shared among processors of the controller 114.

The controller 114 can be coupled to and control access to a buffer 122, which can temporarily store data associated with read commands and write commands. The buffer 122 can be a volatile memory, such as DRAM, SRAM, and the like. Further, the controller 114 can be communicatively coupled to respective read/write channels 124A, 124B, and 124C.

The controller processor 116 is configured to, among other things, manage access to the magnetic recording media 106A-C. For example, the controller processor 116 may manage dataflow operations, manage access to the buffer 122, and control the respective read/write channels 130A-C.

The servo processor 118 is configured to, among other things, control operations of the respective actuators 102A-C (and any microactuators coupled to the respective actuators 102A-C) such as track seeking operations, track following operations, and track settling operations. In certain embodiments, the servo processor 118 controls operations of respective pre-amplifiers 126A, 126B, and 126C, which provide signals to the read/write heads 104A-C for writing magnetic transitions to the magnetic recording media 106A-C and receive signals from the read/write heads 104A-C in response to detecting magnetic transitions on the magnetic recording media 106A-C.

The controller 114 also controls scheduling of data transfer commands (e.g., read commands or write commands). During operation, the data storage device 100 receives various data transfer commands from the host 150. A given data transfer command may be directed to a particular actuator (e.g., a read command for data accessible by the first actuator 102A, or a write command to write data to the magnetic recording media 104B accessible by the second actuator 102B). Data received from the host 150 can be encoded or otherwise processed by one of the respective read/write channels 124A-C and eventually stored to the magnetic recording media 106A-C via one of the read/write heads 104A-C coupled to the respective actuators 102A-C. Data associated with a read command may be retrieved from the magnetic recording media 106A-C and stored the in buffer 122. Such data is then transferred to the host 150 by the interface 112 via the controller 114.

Figure 2:
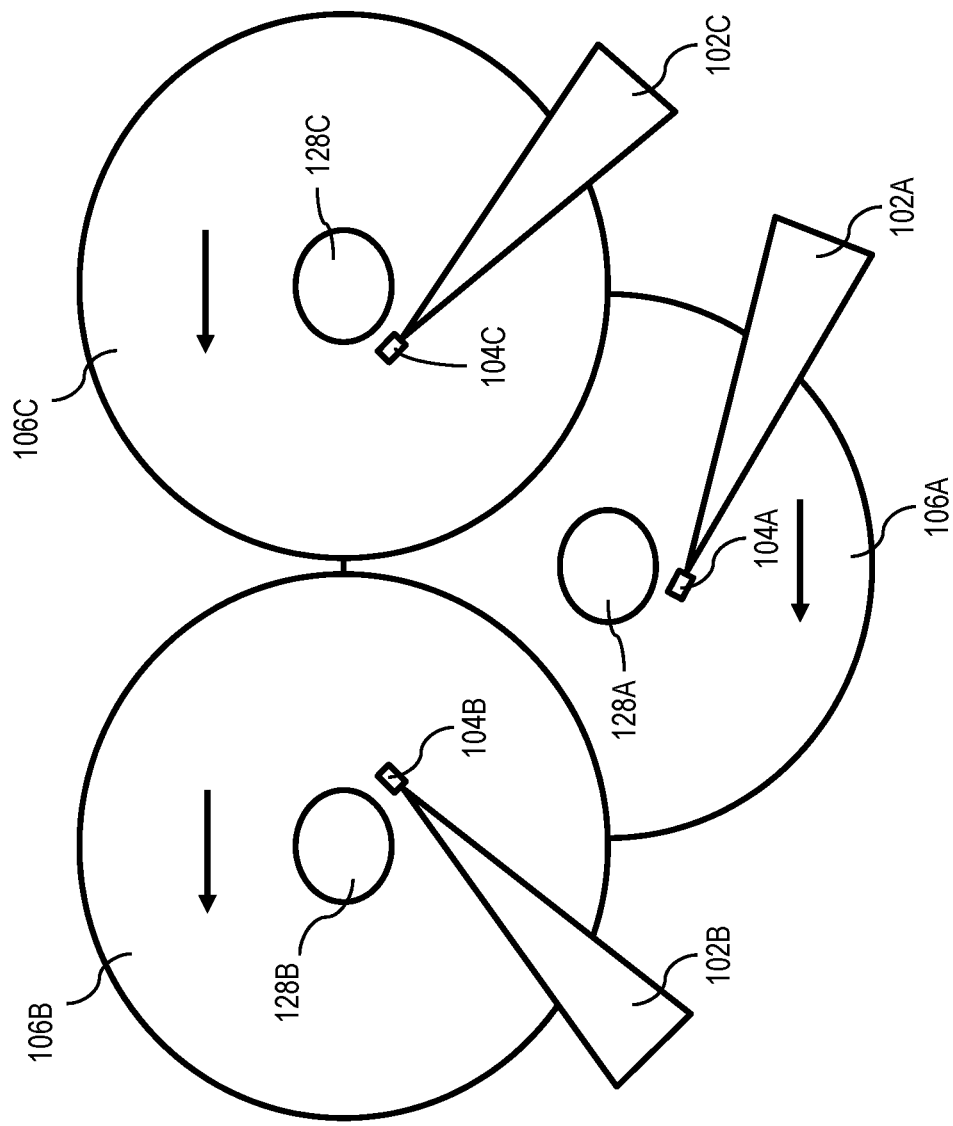
FIG. 2 shows a top view of certain components of the data storage device of FIG. 1, in accordance with certain embodiments of the present disclosure.
Figure 3:
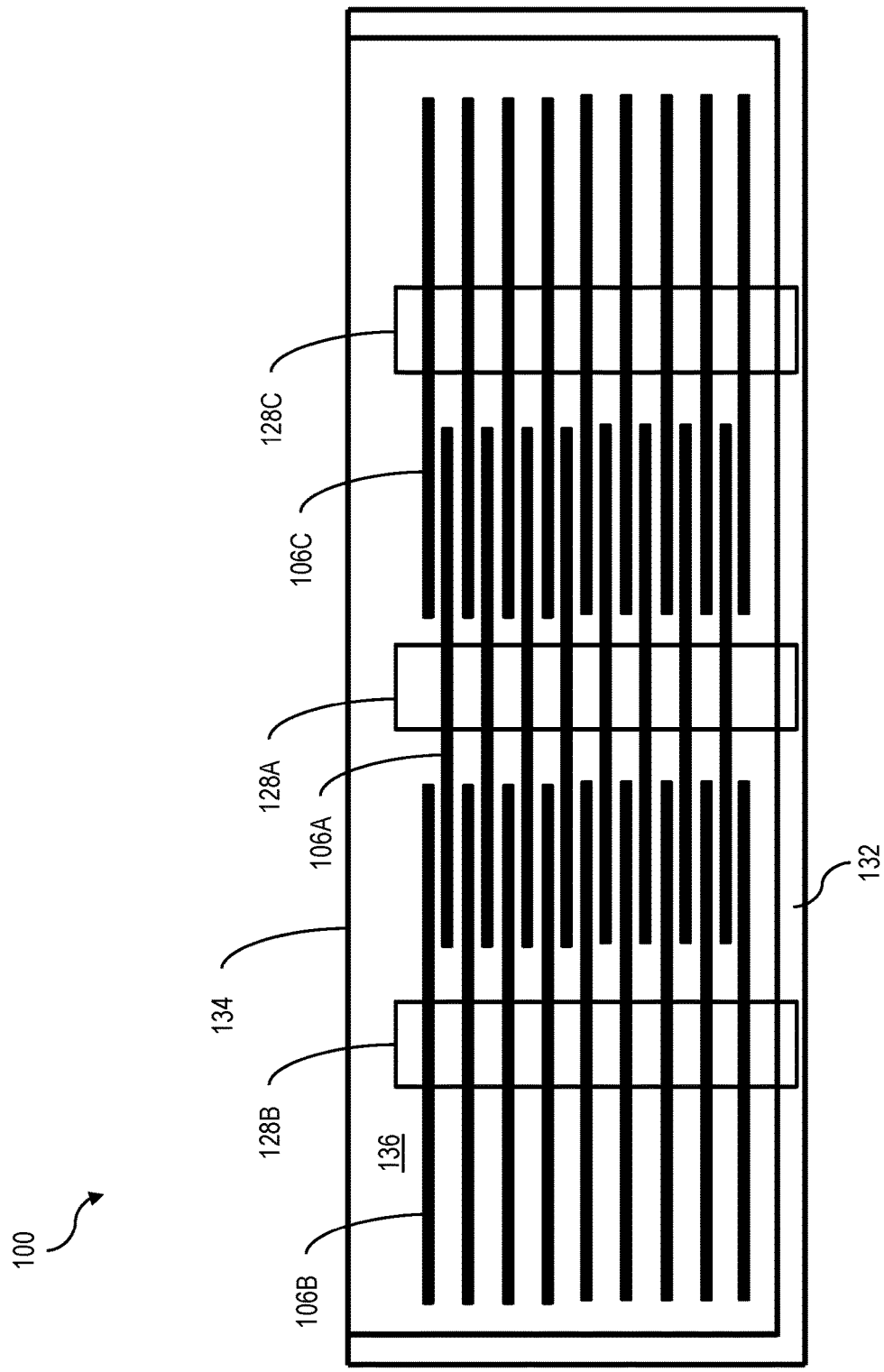
FIG. 3 shows a cutaway side view of certain components of the data storage device of FIG. 1, in accordance with certain embodiments of the present disclosure.
Figure 4:
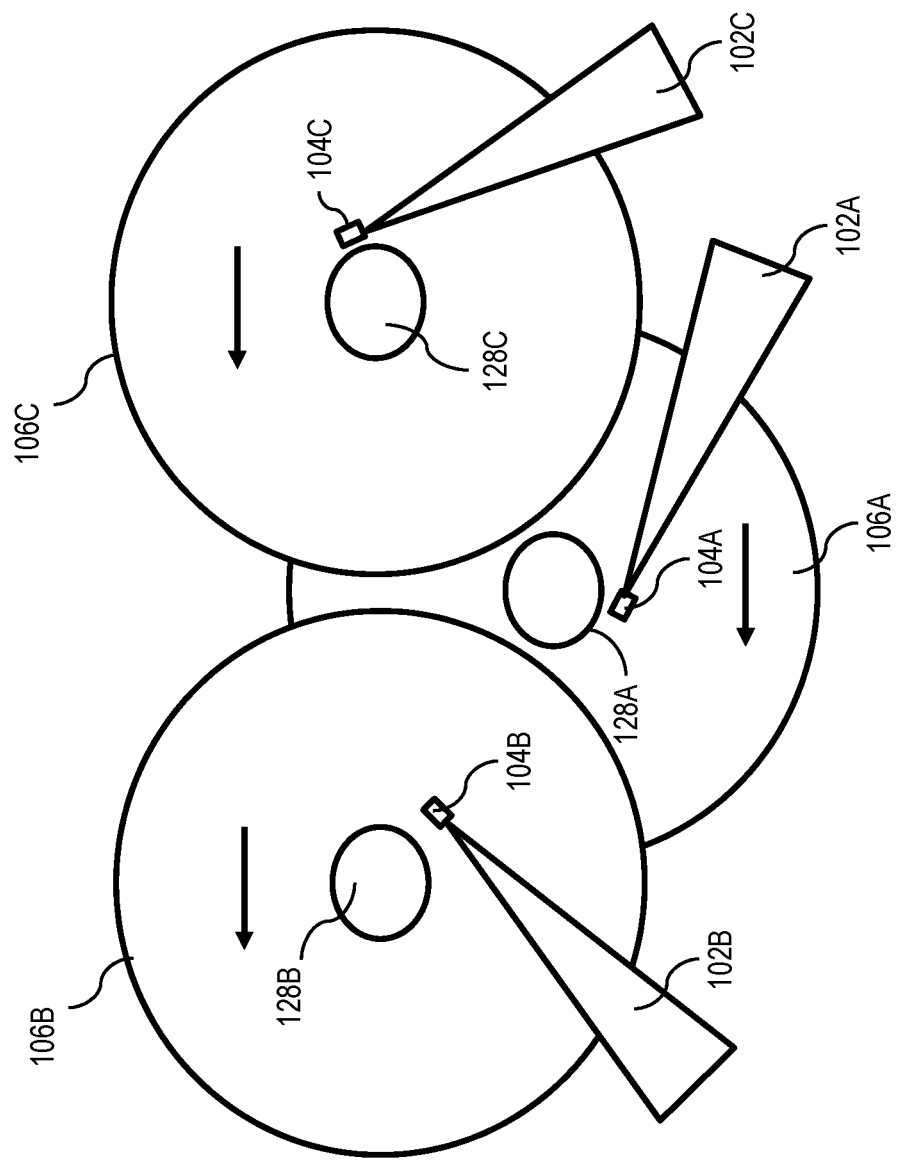
FIG. 4 shows a top view of certain components of the data storage device of FIG. 1, in accordance with certain embodiments of the present disclosure.

The controller 114 is also configured to control operations of the data storage device's spindle motors 128A-C (shown in FIGS. 2-4). For example, the controller 114 can control the speed of the spindle motors 128A-C, when the spindle motors 128A-C spin up and spin down, and different power modes (e.g., power-saving modes) of the spindle motors 128A-C. For example, the controller 114 can control one or more power devices (e.g., amplifiers) that provide power to the spindle motors 128A-C.

Although FIG. 1 and the description above only describe one electrical connector, interface, and SOC with one system controller, etc., the data storage device 100 could include multiple electrical connectors, interfaces, SOCs, and/or system controllers. In certain embodiments, the data storage device 100 includes a single electrical connector and interface but multiple SOCs and controllers. In other embodiments, the data storage device 100 may include multiple electrical connectors and interfaces to increase the amount of data that can be simultaneously transferred to and from the data storage device 100.

In certain embodiments, each of the three actuators, three sets of magnetic recording media, and three spindle motors may be assigned and identified by the host 150 by a separate logical unit number ("LUN"). For example, the host 150 may see each LUN as a separate data storage device. As such, the data storage device 100 can separately and independently control each LUN.

In certain embodiments, the data storage device 100 may attempt to limit how many LUNs simultaneously operate to reduce overall power usage of the data storage device 100. For example, the data storage device 100 can operate only one or two LUNs at a time rather than all three LUNs. As another example, the data storage device 100 can initially operate only one LUN until the magnetic recording media associated with that LUN has been filled or nearly filled to capacity with data. Then, another LUN can be operated until the magnetic recording media associated with that LUN has been filled or nearly filled to capacity, and so on. Once a LUN's set of magnetic recording media has been filled with data, the spindle motor of that LUN can be powered off or operated at a lower speed (e.g., idled) until data stored to the set of magnetic recording media is requested from the host 150 (e.g., via a read command). For example, even if two or all three sets of magnetic recording media are filled or at least partially filled with data, the data storage device 100 can power off or idle the LUNs when such data does not need to be accessed by the host 150. In addition to powering off or reducing power of a given spindle motor 128A-C, circuitry associated with the powered off or idled LUN can be set to a lower power mode. For example, circuitry for servo operations of a given LUN can be set to a low- or no-power mode to further reduce overall power usage of the data storage device 100.

In certain embodiments, all LUNs can be operated simultaneously. For example, each LUN can carry out parallel data operations (e.g., read operations and/or write operations) to increase the data throughput of the data storage device 100. When all spindle motors 128A-C are operated, the first spindle motor 128A can rotate the first set of magnetic recording media 106A in one direction (e.g., clockwise) while the second and third spindle motors 128B and 128C can rotate the respective second and third sets of magnetic recording media 106B and 106C in the opposite direction (e.g., counterclockwise) of the first set of magnetic recording media 106A. This opposing rotation or counter-rotation can help balance the vibration generated from the rotating sets of magnetic recording media 106A-C. In certain embodiments, each spindle motor 128A-C is designed to and powered to rotate at the same speed (e.g., 5400 rpm, 7200 rpm, 10,000 rpm) during full operation and a lower speed during idling periods.

In certain embodiments, the different sets of magnetic recording media can be used in a RAID configuration (a configuration of a Redundant Array of Independent Disks) such that the different sets of magnetic recording media are used to backup data from each other.

FIG. 2 shows a top view of the multiple actuators 102A-C, the multiple read/write heads 104A-C, the sets of magnetic recording media 106A-C, and the spindle motors 128A-C of the data storage device 100. FIG. 3 shows a cutaway side view of the data storage device, but for clarity, does not show the multiple actuators 102A-C.

As shown in FIG. 2, the first set of magnetic recording media 106A is coupled to the first spindle motor 128A, the second set of magnetic recording media 106B is coupled to the second spindle motor 128B, and the third set of magnetic recording media 106C is coupled to the third spindle motor 128C. The first set of magnetic recording media 106A at least partially overlaps with the second set of magnetic recording media 106B and the third set of magnetic recording media 106C. Put another way, an envelope of the first set of magnetic recording media 106A at least partially overlaps with envelopes of the second set of magnetic recording media 106*6* and the third set of magnetic recording media 106C. As shown in FIG. 2, the second set of magnetic recording media 106B and the third set of magnetic recording media 106C do not overlap with each other.

As shown in FIG. 3, the first set of magnetic recording media 106A is interdigitated with the second set of magnetic recording media 106B and the third set of magnetic recording media 106C. Put another way, each disk of the first set of magnetic recording media 106A is positioned between respective pairs of the second set of magnetic recording media 106B and the third set of magnetic recording media 106C. In certain embodiments, the spacing between opposing surfaces of the disks (e.g., the spacing between respective disk surfaces of the first set of magnetic recording media 106A is interdigitated with the second set of magnetic recording media 106B), is approximately 1.5-2 mm (e.g., 1.6 mm, 1.7 mm, 1.8 mm, 1.9 mm). In certain embodiments, the disks are approximately 0.5 mm thick. As such, each adjacent pair of disks of a given set of magnetic recording media may be spaced approximately 3.5-4.5 mm from each other.

In certain embodiments, the second set of magnetic recording media 106*6* and the third set of magnetic recording media 106C include more disks than the first set of magnetic recording media 106A. In the example shown in FIG. 3, the first set of magnetic recording media 106A includes eight disks while the second set of magnetic recording media 106B and the third set of magnetic recording media 106C each include nine disks for a total of 26 disks positioned in the data storage device 100. In other examples, the first set of magnetic recording media 106A includes nine disks while the second set of magnetic recording media 106B and the third set of magnetic recording media 106C each include ten disks. In other embodiments, each set of magnetic recording media 106A-C include the same number of disks (e.g., seven disks, eight disks, nine disks, ten disks). More generally, the second set of magnetic recording media 106B and the third set of magnetic recording media 106C can have "n" number of disks and the first set of magnetic recording media 106A can include n−1, n, or n+1 disks.

As shown in FIG. 3, the data storage device 100 includes a base deck 132 and a cover 134 that is coupled (e.g., fastened or welded) to the base deck 132 to create an internal enclosure 136. The actuators 102A-C and the sets of magnetic recording media 106A-C are positioned within the internal enclosure 136, and the spindle motors 128A-C are coupled to the base deck 132 and at least partially positioned within the internal enclosure 136.

In certain embodiments, the internal enclosure 136 is sized as to conform to an industry standard (e.g., a 3.5-inch form factor). In such embodiments, with the multiple sets of magnetic recording media 106A-C shown in FIGS. 1-3, the data storage device 100 includes more useable data storage area compared to similar-sized data storage devices with only a single set of magnetic recording media. For example, when a single set of magnetic recording media with nine 97 mm-diameter disks is used in a 3.5" form factor data storage device, the total useable data storage area is approximately 171 in$^2$ (assuming that an inner diameter of the disk is 25 mm, that the inner and outer 2 mm of the disks are not used for data, and that both major surfaces of the disks are used for data storage).

In embodiments with 26 individual 65 mm-diameter disks in a 3.5" form factor, the total useable data storage area is approximately 199 in$^2$ (assuming that an inner diameter of the disk is 20 mm, that the inner and outer 2 mm of the disks are not used for data, and that both major surfaces of the disks are used for data storage), which is approximately 116% of the total useable data storage area of a data storage device with nine 97 mm-diameter disks. In embodiments, the disks of the magnetic recording media can have diameters of 63-67 mm.

FIG. 4 shows an example of the relative positioning of larger diameter disks coupled to spindle motors. In embodiments with 26 individual 70 mm-diameter disks in a 3.5" form factor, the total useable data storage area is approximately 239 in$^2$ (assuming that an inner diameter of the disk is 20 mm, that the inner and outer 2 mm of the disks are not used for data, and that both major surfaces of the disks are used for data storage), which is approximately 140% of the total useable data storage area of a data storage device with nine 97 mm-diameter disks. In embodiments, the disks of the magnetic recording media can have diameters of 69-71 mm. In certain embodiments, the total useable data storage area of the first set of magnetic recording media, the second set of magnetic recording media, and the third set of magnetic recording media is 198-250 int.

Although the disks of the sets of magnetic recording media 106A-C are shown and described as having the same size of diameter, the diameters of the disks can be different. For example, space and size restraints of the data storage device 100 may provide opportunities to use different sized disks. As another example, spindle motors rotating smaller diameter disks use less power compared to larger diameter disks at a given rotating speed.

Figure 5:
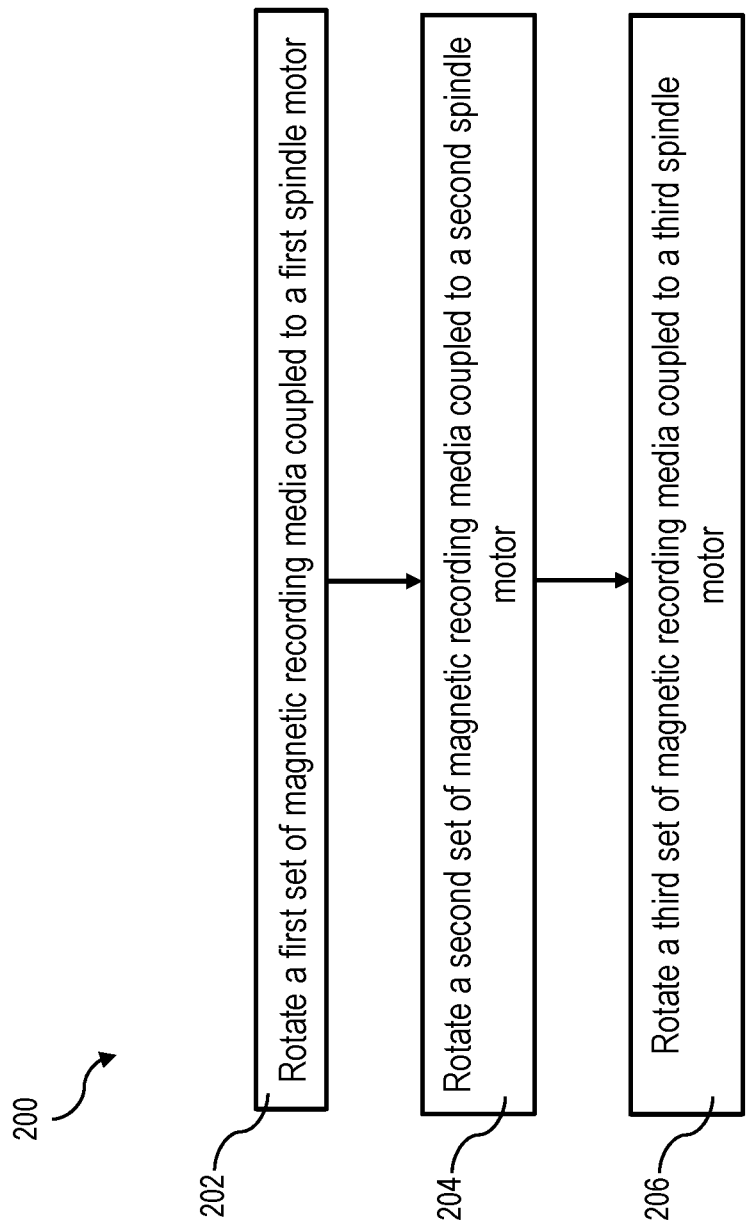
FIG. 5 depicts a block diagram of steps of a method, in accordance with certain embodiments of the present disclosure.

FIG. 5 outlines a method 200 for operating the data storage device 100. The method 200 includes rotating the first set of magnetic recording media 106A coupled to the first spindle motor 128A (block 202 in FIG. 5). The method 200 further includes rotating the second set of magnetic recording media 106B coupled to the second spindle motor 128B (block 204 in FIG. 5). The method 200 further includes rotating the third set of magnetic recording media 106C coupled to the third spindle motor 128C (block 206 in FIG. 5). As previously noted, an envelope of the first set of magnetic recording media 106A at least partially overlaps with envelopes of the second set of magnetic recording media 106B and the third set of magnetic recording media 106C. Further, in certain embodiments, the first set of magnetic recording media 106A rotate in an opposite rotational direction as the second set of magnetic recording media 106B and third set of magnetic recording media 106C.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

What is claimed is:

1. A hard disk drive comprising:
    an enclosure including a first set of magnetic recording media coupled to a first spindle motor, a second set of magnetic recording media coupled to a second spindle motor, and a third set of magnetic recording media coupled to a third spindle motor, wherein the first set of magnetic recording media at least partially overlaps with the second set of magnetic recording media and the third set of magnetic recording media, wherein the first set of magnetic recording media, the second set of magnetic recording media, and the third set of magnetic recording media have outer diameters of 63-67 mm.

2. The hard disk drive of claim 1, wherein the second set of magnetic recording media and the third set of magnetic recording media include more disks than the first set of magnetic recording media.

3. The hard disk drive of claim 2, wherein the second set of magnetic recording media and the third set of magnetic recording media include nine disks and the first set of magnetic recording media includes eight disks.

4. The hard disk drive of claim 1, wherein the first set of magnetic recording media, the second set of magnetic recording media, and the third set of magnetic recording media include the same number of disks.

5. The hard disk drive of claim 4, wherein the first set of magnetic recording media includes nine disks.

6. The hard disk drive of claim 1, wherein the second set of magnetic recording media and the third set of magnetic recording media rotate in an opposite direction of the first set of magnetic recording media.

7. The hard disk drive of claim 1, wherein a total useable data storage area of the first set of magnetic recording media, the second set of magnetic recording media, and the third set of magnetic recording media is 198-250 in$^2$.

8. The hard disk drive of claim 1, wherein adjacent disk surfaces of the first set of magnetic recording media are spaced at 3.5-4 mm from each other.

9. The hard disk drive of claim 8, wherein each disk of the first set of magnetic recording media, the second set of magnetic recording media, and the third set of magnetic recording media has a thickness at or substantially near 0.5 mm.

10. The hard disk drive of claim 1, further comprising a controller, wherein the controller is configured to control the first spindle motor, the second spindle motor, and the third spindle motor at a first mode, the first mode including rotating only one spindle motor at a given point in time.

11. The hard disk drive of claim 1, further comprising a controller, wherein the controller is configured to control the first spindle motor, the second spindle motor, and the third spindle motor at a first mode, the first mode including rotating only two spindle motors at a given point in time.

12. The hard disk drive of claim 1, further comprising a controller, wherein the controller is configured to control the first spindle motor to rotate at a first rotational direction and to control the second spindle motor and the third spindle motor to rotate at a second rotational direction opposite the first rotational direction.

13. The hard disk drive of claim 1, further comprising:
a first actuator arranged to position a first set of read/write heads over the first set of magnetic recording media;
a second actuator arranged to position a second set of read/write heads over the second set of magnetic recording media; and
a third actuator arranged to position a third set of read/write heads over the third set of magnetic recording media.

14. The hard disk drive of claim 13, wherein the first actuator, the second actuator, and the third actuator are independently controlled by a controller.

15. The hard disk drive of claim 1, wherein the second set of magnetic recording media and the third set of magnetic recording media do not overlap with each other.

16. A hard disk drive comprising:
means for providing a total useable data storage area of 198-250 in$^2$; and
means for accessing the total useable data storage area.

17. The hard disk drive of claim 16, further comprising:
means for rotating the total useable data storage area.

18. A method comprising:
rotating a first set of magnetic recording media coupled to a first spindle motor;
rotating a second set of magnetic recording media coupled to a second spindle motor; and
rotating a third set of magnetic recording media coupled to a third spindle motor,
wherein an envelope of the first set of magnetic recording media at least partially overlaps with envelopes of the second set of magnetic recording media and the third set of magnetic recording media, wherein envelopes of the second set of magnetic recording media and the third set of magnetic recording media do not overlap, wherein the first set of magnetic recording media, the second set of magnetic recording media, and the third set of magnetic recording media have outer diameters of 69-71 mm.

19. The method of claim 18, wherein the first set of magnetic recording media includes nine disks.

\* \* \* \* \*